United States Patent
Paudel et al.

(10) Patent No.: US 11,209,831 B2
(45) Date of Patent: Dec. 28, 2021

(54) OBJECT SOUND DETECTION

(71) Applicant: Ford Global Technologies, LLC, Dearborn, MI (US)

(72) Inventors: Shreyasha Paudel, Sunnyvale, CA (US); Jinesh Jain, Palo Alto, CA (US); Gaurav Pandey, Foster City, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 213 days.

(21) Appl. No.: 16/402,367

(22) Filed: May 3, 2019

(65) Prior Publication Data

US 2020/0348687 A1    Nov. 5, 2020

(51) Int. Cl.
    *G05D 1/02*        (2020.01)
    *B60W 30/09*       (2012.01)
    *B60W 30/095*      (2012.01)

(52) U.S. Cl.
    CPC ........... *G05D 1/0255* (2013.01); *B60W 30/09* (2013.01); *B60W 30/0956* (2013.01); *G05D 1/0274* (2013.01); *B60W 2420/54* (2013.01); *B60W 2552/00* (2020.02); *G05D 2201/0213* (2013.01)

(58) Field of Classification Search
    None
    See application file for complete search history.

(56) References Cited

U.S. PATENT DOCUMENTS

| | | | |
|---|---|---|---|
| 9,278,689 B1 * | 3/2016 | Delp | G08G 1/0965 |
| 9,937,922 B2 | 4/2018 | Reiff et al. | |
| 9,996,080 B2 | 6/2018 | Banvait et al. | |
| 10,055,675 B2 | 8/2018 | Micks et al. | |
| 10,127,818 B2 * | 11/2018 | Mandeville-Clarke | B62D 15/025 |
| 10,284,317 B1 * | 5/2019 | Sanchez | H04H 20/62 |
| 2005/0134440 A1 * | 6/2005 | Breed | G01S 17/89 |
| | | | 340/435 |
| 2012/0075336 A1 * | 3/2012 | Oda | G06F 3/165 |
| | | | 345/629 |
| 2015/0226831 A1 * | 8/2015 | Nakamura | G01S 5/20 |
| | | | 367/118 |
| 2015/0304784 A1 * | 10/2015 | Snider | G08G 1/0965 |
| | | | 381/56 |
| 2015/0358750 A1 * | 12/2015 | Choi | H04R 3/002 |
| | | | 381/71.1 |
| 2017/0213459 A1 * | 7/2017 | Ogaz | G08G 1/166 |
| 2018/0302738 A1 | 10/2018 | DeCenso et al. | |

(Continued)

OTHER PUBLICATIONS

"3D sound localization", Wikipedia, https://en.wikipedia.org/w/index.php?title=3D_sound_localization&oldid=884111794, Published Feb. 19, 2019.

(Continued)

*Primary Examiner* — James J Lee
*Assistant Examiner* — Tawri M Matsushige
(74) *Attorney, Agent, or Firm* — Frank A. MacKenzie; Bejin Bieneman PLC (57) ABSTRACT

A vehicle system includes a processor and a memory. The memory stores instructions executable by the processor to identify an area of interest from a plurality of areas on a map, to determine that a detected sound is received in a vehicle audio sensor upon determining that a source of the sound is within the area of interest and not another area in the plurality of areas, and to operate the vehicle based at least in part on the detected sound.

16 Claims, 4 Drawing Sheets

(56) References Cited

U.S. PATENT DOCUMENTS

| | | | | |
|---|---|---|---|---|
| 2018/0374347 A1* | 12/2018 | Silver | .................. | G06F 16/683 |
| 2019/0220248 A1* | 7/2019 | Maruri | ..................... | G06N 3/02 |
| 2020/0031337 A1* | 1/2020 | Soltanian | .......... | B60W 30/0956 |
| 2020/0064856 A1* | 2/2020 | Silver | ................. | G05D 1/0088 |

OTHER PUBLICATIONS

Kakar et al., "Techniques for Acoustic Feature Extraction for Detection and Classification of Ground Vehicles", International Journal of Emerging Technology and Advanced Engineering, vol. 3, Issue 2, Feb. 2013, www.ijetae.com (ISSN 2250-2459, ISO 9001:2008.
Martinson et al., "Noise Maps for Acoustically Sensitive Navigation", Copyright 2004 Society of Photo-Optical nstrumentation Engineers. This paper will be published in Proceedings of SPIE, vol. 5609.

* cited by examiner

FIG. 3B

OBJECT SOUND DETECTION

BACKGROUND

One or more computers in an autonomous vehicle (or self-driving car) can be programmed to navigate and operate the vehicle based on vehicle sensor data. The vehicle computers may rely on data from object detection sensors to detect objects. However, problems may arise when an object cannot be reliably identified, for example when an object is outside a sensor field of view, there is uncertainty about an object identified in the sensor data, e.g., due to noise, imprecise data, a blurry image, etc.

DETAILED DESCRIPTION

Introduction

A vehicle system comprises a processor and a memory. The memory stores instructions executable by the processor to identify an area of interest from a plurality of areas on a map, to determine that a detected sound is received in a vehicle audio sensor upon determining that a source of the sound is within the area of interest and not another area in the plurality of areas, and to operate the vehicle based at least in part on the detected sound.

The instructions may further include instructions to ignore the detected sound upon determining that the source of the detected sound is without the area of interest.

The instructions may further include instructions to identify the area of interest based in part on a planned route of the vehicle.

The instructions may further include instructions to identify the area of interest based on at least one of a physical barrier, a road boundary, and a distance from a current location of the vehicle.

The instructions further include instructions to determine a parameter of the source including at least one of a type, a trajectory, and a location of the source based on at least an amplitude and a frequency of the detected sound, and to determine that the source is included in an object in the area of interest based on the determined parameter and map data.

The instructions may further include instructions to adjust a planned path of the vehicle based on a planned route of the vehicle and the determined trajectory of the source.

The instructions may further include instructions to determine a location of the source and to determine that the source is within the identified area of interest based on the determined location of the source.

The instructions may further include instructions to determine based on a classification of the source and map data that the classification of the source is invalid.

The instructions may further include instructions to determine, based on the classification of the source, an expected infrastructure component for the determined location of the source, and to determine that the classification of the source is invalid upon determining, based on the map data, that the expected infrastructure component is non-existent at the location of the source.

The classification may be one of a train, a truck, a bicycle, a motorbike, a passenger vehicle, and an emergency vehicle, and the infrastructure component is one of a train track and a road.

The instructions may further include instructions to adjust a planned path of the vehicle based on the planned route of the vehicle, the determined trajectory of the source, and the classification of the source only upon determining that the source is valid.

Further disclosed herein is a method comprising identifying an area of interest from a plurality of areas on a map, determining that a detected sound is received in a vehicle audio sensor upon determining that a source of the detected sound is within the area of interest and not another area in the plurality of areas, and operating the vehicle based at least in part on the detected sound.

The method may further include ignoring the detected sound upon determining that the source of the detected sound is without the area of interest.

The method may further include identifying the area of interest based in part on a planned route of the vehicle, a physical barrier, a road boundary, and a distance from a current location of the vehicle.

The method may further include determining a parameter of the source including at least one of a type, a trajectory, and a location of the source based on at least an amplitude and a frequency of the detected sound, and determining that the source is included in an object in the area of interest based on the determined parameter and map data.

The method may further include adjusting a planned path of the vehicle based on a planned route of the vehicle and a determined trajectory of the source.

The method may further include determining based on a classification of the source and map data that the classification of the detected source is invalid.

The method may further include determining, based on the classification of the source, an expected infrastructure component for the location of the source, and determining that the classification of the source is invalid upon determining, based on the map data, that the expected infrastructure component is non-existent at the location of the source.

The classification may be one of a train, a truck, a bicycle, a passenger vehicle, and an emergency vehicle, and the infrastructure component is one of a train track and a road.

The method may further include adjusting a planned path of the vehicle based on a planned route of the vehicle, a determined trajectory of the source, and the classification of the source only upon determining that the detected source is valid.

Further disclosed is a computing device programmed to execute the any of the above method steps.

Yet further disclosed is a computer program product, comprising a computer readable medium storing instructions executable by a computer processor, to execute any of the above method steps.

System Elements

One or more computers in an autonomous or semi-autonomous vehicle can be programmed to navigate and operate the vehicle based on vehicle sensor data. However, vehicle object detection sensor(s) may fail to detect an object or provide inconclusive sensor data. In one example, a vehicle computer can be programmed to identify an area of interest from a plurality of areas on a map, determine that a detected sound is received in a vehicle audio sensor upon determining that a source of the sound is within the area of interest and not another area in the plurality of areas; and operate the vehicle based at least in part on the detected sound. Thus, by operating the vehicle only based on sources within the area of interest, the computer 110 may perform less computation and/or consume fewer processing cycles compared to operating the vehicle based on sound sources detected anywhere within a detection range of the vehicle.

Figure 1:
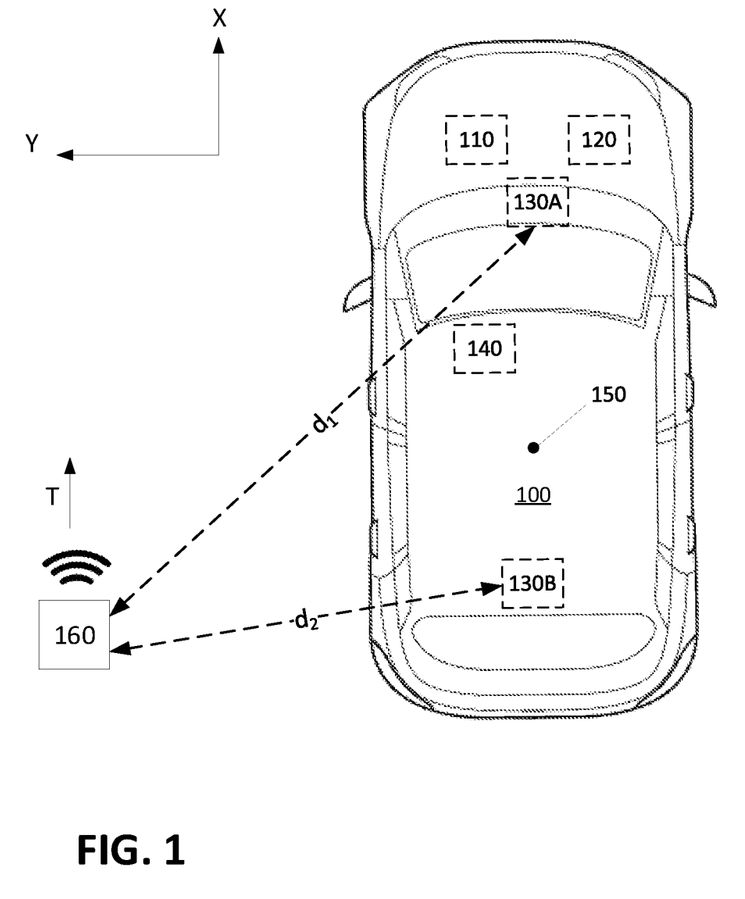
FIG. 1 is a diagram showing a vehicle and a sound source outside the vehicle.

FIG. 1 illustrates an example host or ego vehicle 100 including a computer 110, actuator(s) 120, one or more sensors 130A, 130B, and a human machine interface (HMI 140). A reference point such as a geometrical center point 150 can be specified for a vehicle 100, e.g., a point at which respective longitudinal and lateral centerlines of the vehicle 100 intersect. A vehicle 100 may be powered in variety of known ways, e.g., with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the sensors 130A, 130B, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120.

Vehicle 100 sensors 130A, 130B may provide data encompassing at least some of an exterior of the vehicle 130, e.g., a GPS (Global Positioning System) sensor, audio sensor, camera, radar, and/or lidar (light imaging detection and ranging). For example, the vehicle 100 computer 110 may be programmed to determine vehicle 100 location coordinates based data received from a vehicle 100 GPS sensor 130A, e.g., with respect to X, Y axes of a Cartesian coordinate system. An origin of the Cartesian coordinate system may be at an intersection of X, Y axes of the Cartesian coordinate system.

The vehicle 100 may include object detection sensors 130A, 130B that provide data to determine attributes (i.e., physical descriptions) of an object such as location, type, dimensions, trajectory, etc., of objects within respective fields of view of the sensors 130A, 130B. Using data fusion techniques, the computer 110 may be programmed to determine object data based on data received from multiple object detection sensors 130A, 130B, e.g., a camera and a radar sensor 130A, 130B with overlapping fields of view.

Additionally or alternatively, sensors 130A, 130B can include audio sensors for detecting sound source(s) 160. The audio sensors 130A, 130B may be microphone(s) that are mounted to a vehicle 100 body, e.g., on or underneath an exterior surface of the vehicle 100. The audio sensors 130A, 130B may be mounted in different locations, e.g., front, rear, side, etc., of the vehicle 100. In one example, the audio sensors 130A, 130B may include an array of microphones included in a housing. The sound sensors 130A, 130B may be directional microphones. A directional microphone such as cardioid microphone is designed to receive sound from a particular direction, e.g., a right, left, front or rear side of the vehicle 100. The computer 110 may be programmed to receive audio data from the audio sensors 130A, 130B. The sound may come from a car, truck, emergency service vehicle (ambulance, police car, fire truck), bicycle, pedestrian, train, bus, etc. In other words, the sound source 160 may be included in a car, truck, etc. For example, sound from a vehicle may come from rotational parts, vibrations in the engine, friction between tires and road surface, vibrations of an electric motor, wind effect, gears, fans. In another example, sound may come from human pedestrian, bicycles rider, etc. In yet another example, sound may be generated by a device such as an ambulance siren, a train horn, a vehicle horn, etc.

The computer 110 may be programmed to detect the sound source 160 based on audio data received from the audio sensors 130A, 130B, and to identify location and/or trajectory T of the sound source 160 relative to the vehicle 100 using signal processing techniques. The computer 110 may be programmed to determine the sound source 160 location using a triangulation technique and/or other signal processing techniques such as time difference of arrival, particle velocity probe, etc. For example, the computer 110 may be programmed to estimate distances $d_1$, $d_2$ from a sound source 160 to the vehicle 100 sensors 130A, 130B based on amplitude of sound received at each of the sensors 130A, 130B. The computer 110 may store a location and/or an orientation of audio sensors 130A, 130B relative to the vehicle 100 reference point 150, e.g., three-dimensional coordinates of sensor(s) 130A, 130B relative to the reference point 150. Additionally or alternatively, the computer 110 may store coordinates of a vector originated from the location of the sensor 130A, 130B that defines, e.g., a direction of a microphone polar pattern. Thus, the computer 110 may be programmed to estimate location (longitudinal and lateral coordinate) of the sound source 160 relative to the vehicle 100 reference points 150. Further, the computer 110 may be programmed to determine the location of the vehicle 100 reference point 150 relative to a map reference point such as a GPS reference point. Thus, the computer 110 may be further programmed to estimate the location coordinates of the sound source 160 with respect to, e.g., a GPS reference point, based on (i) the determined location of the sound source 160 relative to the vehicle 100 reference point 150 and (ii) GPS location coordinates of the vehicle 100 reference point 150, e.g., determined based on GPS sensor 130A data.

As discussed above, a sound source 160 may be a moving object such as a vehicle, etc., having a trajectory T. A trajectory T for an object is defined by sets of location coordinates for the object at respective times, e.g., locations determined at periodic times. The computer 110 may be programmed to estimate a trajectory T of the sound source 160, e.g., by iteratively determining the location of the sound source 160, e.g., every 100 milliseconds (ms), based on the received audio data and determining the trajectory T based on changes of the sound source 160 location.

An acoustic signature, in the present context, is a combination of multiple sound features, i.e., amplitude and frequency, of a specific type (or class) of sound source(s) 160. A class of sound sources 160 can be defined where different sources 160, e.g., respective ambulance sirens, are expected to have a defined acoustic signature. For example, a frequency component may be specified by a Fourier transform of a sound wave. Classes of sound sources 160 may include emergency vehicle (ambulance, police car, fire truck), passenger vehicle, commercial truck, motorbike, bicycle, pedestrian, etc. In the present context, a classification of sound sources 160 is defined based on an acoustic signature of the respective sound source 160. The computer 110 memory may store a set of sound features, i.e., data including an amplitude and a frequency, corresponding to a class of sound source 160. The computer 110 may be programmed to classify a sound source 160 based on received audio data and stored sound features of a class of source 160.

The computer 110 may be programmed to determine that a sound source 160 is detected upon determining that an amplitude of a received sound exceeds a threshold that is numerically calculated based on the received audio data, e.g., 60 dB (decibel). The threshold may be based on an amplitude of the signal at a source 160, a distance from the source 160 to the vehicle 100, environmental factors such as weather condition, etc. In one example, the computer 110 may be programmed to collect audio data of a variety of sources 160 such as motorcycles, emergency vehicles, etc., in different conditions and to tune (or adjust) the threshold. The computer 110 may be programmed to extract the sound features of a sound source 160 using signal processing techniques, e.g., determining an amplitude, frequency component(s) of sound waves included in the sound. The computer 110 may be programmed to classify the sound source 160 based on the extracted feature(s) using sound recognition techniques.

Figure 2:
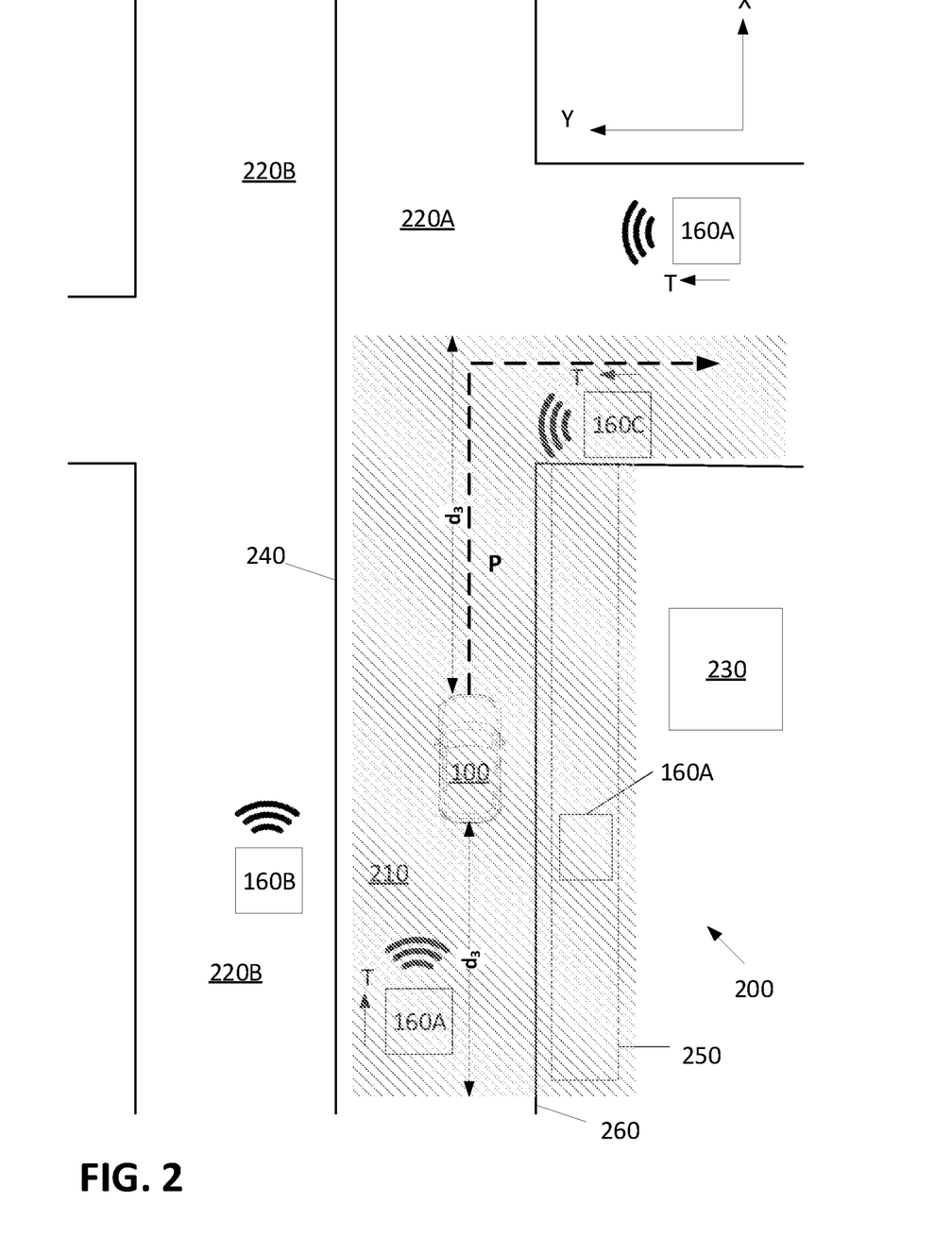
FIG. 2 illustrates the vehicle of FIG. 1 and a plurality of sound sources located inside and outside an area of interest determined with respect to the vehicle.

FIG. 2 illustrates the vehicle 100 in an area 200. A geographical area 200, in the present context, means a two-dimensional area on the map, i.e., on the surface of the earth. Boundaries or edges of an area 200 may be defined by global positioning system (GPS) coordinates, e.g., as vertices of a triangular or rectangular area, a center of a circular area, etc. An area 200 may have any dimensions and/or shape, e.g., rectangular, oval, circular, non-geometrical shape, etc. The area 200 may include one or more roads 220A, 220B, building(s) 230, wall(s) 240, etc. The computer 110 may detect sound sources 160A, 60B, 160C within the area 200 based on audio data received from the vehicle 100 audio sensors 130A, 130B. An area 200 may be divided into a plurality of areas 200, e.g., multiple portions.

In the present context, the area 200 may be a detection range of the vehicle 100 audio sensor(s) 130A, 130B. In other words, the computer 110 may be programmed to receive audio data from the audio sensors 130A, 130B of the vehicle 100 and to detect sound from the area 200 (or detection area 200) based on the received audio data. Thus, an area 200 is defined by a detection range of the vehicle 100 audio sensors 130A, 130B from (e.g., as a radius from a point 150 around) a vehicle 100, as limited by physical features of vehicle 100 surroundings, e.g., a building 230 height, wall(s) 240, surface features that may affect a detection range of the vehicle 100 audio sensors 130A, 130B. For example, a tall building 230 or a wall 240 along a road 220A may limit a detection range of audio sensors 130A, 130B.

The computer 110 may be programmed to extract features of sound received from each of the sound sources 160A, 160B, 160C, and to classify the sound sources 160A, 160B, 160C based on the extracted features. In one example, e.g., to reduce computational tasks of classifying each of the sound sources 160A, 160B, 160C within a detection area 200 of the computer 110, the computer 110 can be programmed to identify an area of interest 210 from a plurality of areas 200 on a map, determine that a detected sound is received in a vehicle 100 audio sensor 130A, 130B upon determining that a source 160 of the sound (or sound source 160) is within the area of interest 210 and not another area in the plurality of areas 200, and to operate the vehicle based at least in part on the detected sound.

In the present context, an area of interest 210 is an area in which a detected object such as a car, truck, pedestrian, train, etc., may result in the computer 110 adjusting a vehicle 100 operation, e.g., steering, braking, and/or acceleration, i.e., .a portion (i.e., some or all) of the detection area 200 in which a sound source 160A, 160B, 160C may direct the computer 110 to adjust a vehicle 100 path P, e.g., to prevent a collision, to give way to an emergency vehicle, etc. In other words, the area of interest 210 is an area that a vehicle 100 path P could cover. Table 1 shows an example set of rules for identifying an area of interest 210. For example, the computer 110 may be programmed to identify the area of interest 210 such that the rules of Table 1 are satisfied. A path P is a straight or curved line on the ground surface along which the vehicle 100 traverses. For example, a path P may be represented by a polynomial of third degree (sometimes referred to as a "path polynomial") such as $Y=aX+bX^2+cX^3$. Y and X represent longitudinal and lateral coordinates, e.g., with respect to the reference point 150. Parameters a, b, and c of such a polynomial may determine a path curvature, on which the vehicle 100 travels. A path P may be defined by a vehicle computer 110 based in part on a planned vehicle 100 route, as well as based on detecting objects, available travel surfaces, etc. Typically a path P is a line on the ground surface starting from a current location of the vehicle 100 extending with a maximum predetermined length, e.g., 100 meters, from the vehicle 100 location. The computer 110 may be programmed to actuate vehicle 100 actuators 120 such that the vehicle 100 traverses the path P.

TABLE 1

| Rule | Description |
| --- | --- |
| Define according to distance from vehicle | An area that is within a distance threshold, e.g., 100 meters, of the vehicle location. |
| Define according to distance from vehicle path | An area that is within a predetermined distance, e.g., 20 meters, from a path of the vehicle, i.e., a distance from a nearest point of the path to a respective point of the area of interest will be less than the threshold. |
| Drivable surface | An area that is defined as "drivable" such as road, bicycle and/or pedestrian surface, etc. Thus, areas covered by buildings, landscaping, etc., will be excluded. |
| Accessible surface | An area from which there is an available route within the detection area to the current vehicle location. For example, a wall, building, etc., may make an area inaccessible, e.g., road 220B is inaccessible from current location of vehicle because of the wall 240. |

The computer 110 may be programmed to identify the area of interest 210 based on a physical barrier, e.g., a wall 240, a road boundary (or shoulder 260), a building 230, etc. For example, the computer 110 may be programmed to determine the area of interest 210 by excluding portions of the detection area 200 physically separated (or inaccessible) from vehicle 100 path P. As an example shown in FIG. 2, a highway wall 240 may separate the roads 220A, 220B. In the present context, a point is inaccessible from a vehicle 100 path P when no direct line without any physical barrier can be drawn from the respective inaccessible point to a point on the path P. For example, the sound source 160B on the road 220B is outside the area of interest 210 because the road 220B is inaccessible with respect to the vehicle 100 path P.

Additionally or alternatively, the computer 110 may be programmed to identify the area of interest 210 based on map data by determining one or more surfaces within the detection area 200 that are drivable. Map data may include location coordinates (e.g., GPS coordinates) of infrastructure elements such as roads 220A, 220B, building(s) 230, bicycle and/or pedestrian path(s) 250, vegetation, etc. In the present context, a drivable surface is a surface on which the vehicle 100 can operate without risk of damage or becoming stuck, and typically includes at least one of a road surface 220A, 20B, a bicycle and/or pedestrian path 250, a parking space, a driveway, etc. In one example, the computer 110 may be programmed to identify drivable surfaces within the area 200 and then to identify the area of interest 210 by selecting accessible portions of the drivable surfaces. For example, as shown in FIG. 2, a road 220B is a drivable surface but is inaccessible for the vehicle 100 because of the wall 240. Therefore, the computer 110 could execute programming to exclude the drivable surface of the road 220B from the area of interest 210.

The computer 110 may be programmed to identify the physical barriers based on vehicle 100 location data and map data. In one example, the computer 110 may be programmed to determine the vehicle 100 location coordinates with respect to X, Y axes, e.g., based on data received from a vehicle 100 GPS sensor 130A, and to identify the physical barriers such as wall 240, road shoulder 260, etc., within the detection area 200 based on map data and the vehicle 100 location.

Additionally or alternatively, the computer 110 may be programmed to identify the area of interest 210 based in part on a planned route P of the vehicle. In one example, the computer 110 may be programmed to identify the area of interest 210 based on a distance $d_3$ from a current location of the vehicle 100, e.g., a distance $d_3$ behind and/or in front of the vehicle 100 along a path P of the vehicle 100.

As discussed above, the computer 110 may be programmed to determine a parameter of, e.g., the source 160A, including at least one of a type (or classification), a trajectory T, and a location of the source 160A based on extracted feature(s) of the sound, e.g., an amplitude and/or a frequency of the sound. The computer 110 may be programmed to determine that the source 160A is included in an object in the area of interest 210 based on the determined parameter, e.g., location, and map data.

For example, the computer 110 may be programmed to determine that the source 160B is outside the area of interest 210 based on identified area of interest 210 and the detected location and/or trajectory T of the source 160B. The computer 110 may be programmed to ignore the received sound of the source 160B upon determining that the sound source 160B is outside the area of interest 210. In one example, the computer 110 may be programmed to classify a sound source 160A, 160C only upon determining that the sound source 160A, 160C is/are within the area of interest 210. This may reduce a computational task of the computer 110 compared to classifying each sound source 160A, 160B, 160C within the detection area 200.

In one example, the computer 110 may misclassify a sound source 160C that is determined to be located within the area of interest 210. For example, the computer 110 may classify the sound source 160C as a train. The computer 110 may be programmed to determine based on a classification of the source 160C and the map data that the determined classification of the detected source 160C is invalid. For example, the computer 110 may be programmed to determine, based on the classification of the source 160C, an expected infrastructure component for the determined location of the source 160C, and to determine that the detected source 160C is invalid upon determining, based on the map data, that the expected infrastructure component is non-existent at the location of the source 160C.

An expected infrastructure component is a physical feature associated with a class of sound source 160, e.g., a train track, a road 220A, 220B, etc. For example, the computer 110 may be programmed to determine based on map data that no train track exists at a location of the sound source 160C and to determine that the classification of the sound source 160C with a "train" classification is invalid because the expected train track for a train is non-existent at the determined location of the sound source 160C. Thus, the computer 110 may be programmed to conclude that the train classification of the sound source 160C is invalid. As discussed below, the computer 110 may be programmed to operate the vehicle 100 only upon determining that a classified sound source 160A is valid. As another example, the computer 110 may determine a sound source (not shown) with a vehicle classification at a location of a pedestrian path 250 is invalid upon determining based on map data that no road 220A, 20B exists at the determined location of the sound source.

The computer 110 may be programmed to adjust a planned path P of the vehicle 100 based on the planned route of the vehicle 100, the determined trajectory T of the source 160A, and the classification of the source 160A only upon determining that the classification of the detected source 160A is valid. The computer 110 may be programmed to actuate a vehicle 100 actuator 120, e.g., braking, steering, and/or propulsion, to adjust a vehicle 100 path, to stop, etc., based on the received sensor 130A, 130B data. Table 2 shows a set of exemplary rules for operating the vehicle 100 based at least in part on a valid sound source 160A.

TABLE 2

| Rule | Description |
| --- | --- |
| Move to shoulder and stop | Actuate vehicle actuators to move the vehicle to a road shoulder and stop the vehicle upon detecting an emergency vehicle (e.g., police, fire truck, ambulance) with activated siren within the area of interest |
| Adjust path to prevent collision | Determine vehicle path based at least in part based on the detected non-emergency sound source, e.g., truck, car, bicycle, motorbike, pedestrian, etc. For example, the vehicle path within the lane may be adjusted, e.g., by moving near a right edge of the lane, to allow a motorbike moving between two lanes to pass by. |

Figure 3A:
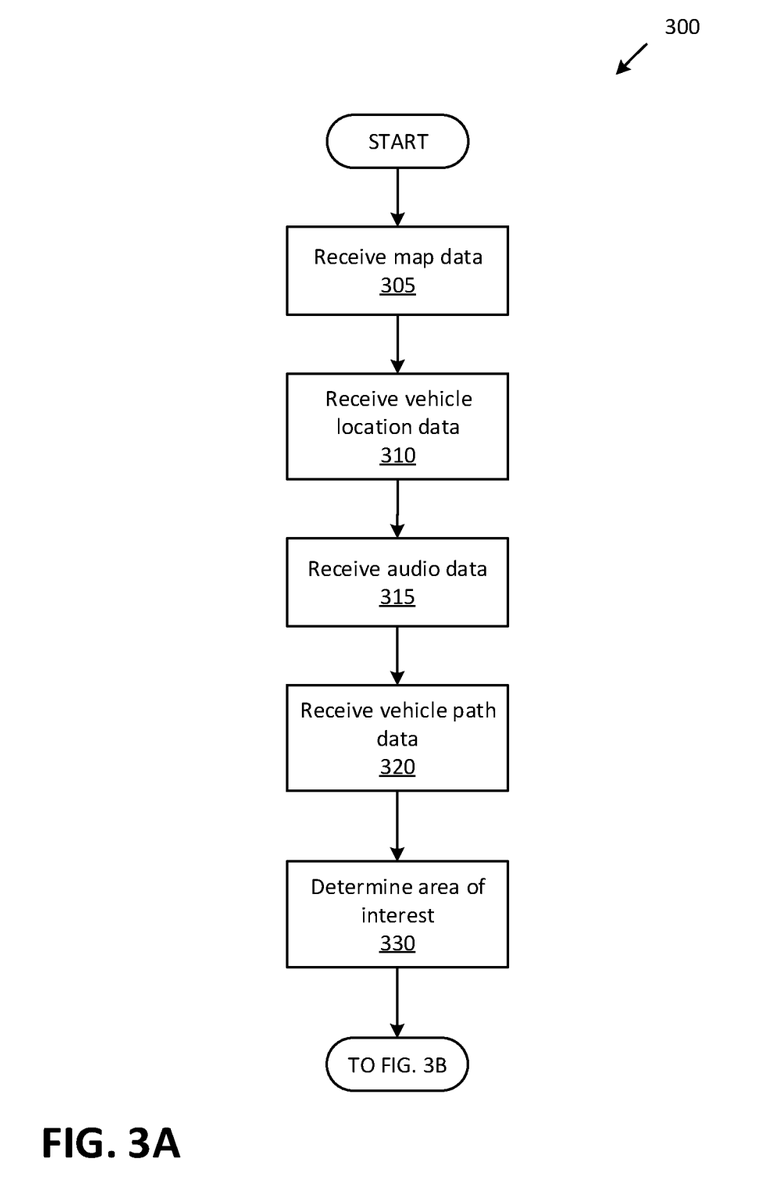
FIGS. 3A-3B are a flowchart of an example process for analyzing received audio data and operating the vehicle.
Figure 3B:
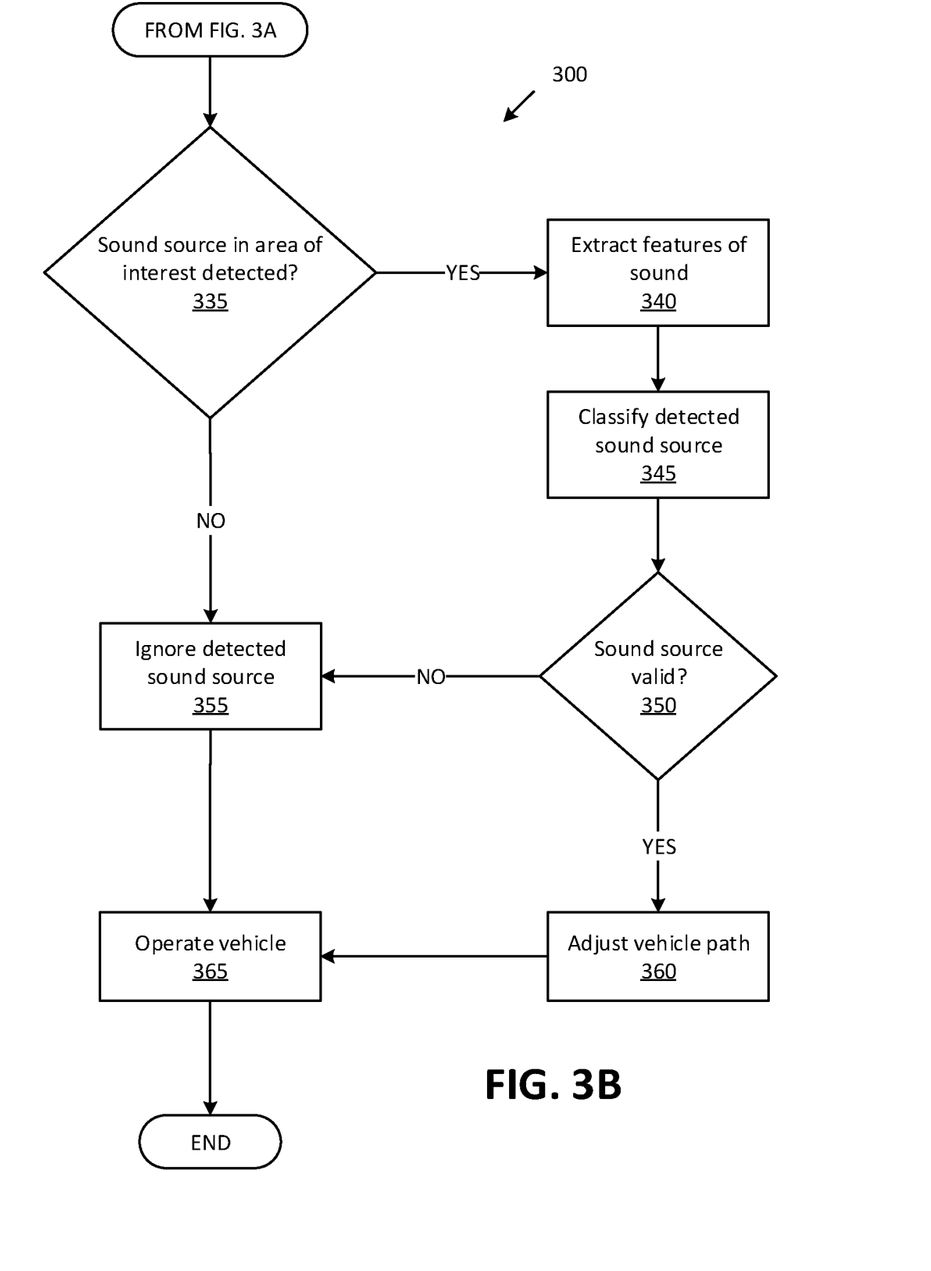

FIGS. 3A-3B are a flowchart of an example process 300 for analyzing received audio data and operating the vehicle 100. For example, a vehicle 100 computer 110 may be programmed to execute blocks of the process 300.

With reference to FIG. 3A, the process 300 begins in a block 305, in which the computer 110 receives map data, e.g., from a remote computer. Additionally or alternatively, the map data may be stored in a computer memory in the vehicle 100.

Next, in a block 310, the computer 110 receives vehicle 100 location data. For example, the computer 110 receives GPS location coordinates from a vehicle 100 GPS sensor 130A, 130B. Additionally or alternatively, the computer 110 may be programmed to determine the vehicle 100 location using a localization technique, e.g., based on lidar (Light detection and ranging) data, etc.

Next, in a block 315, the computer 110 receives audio data. The computer 110 may receive audio data from one or more audio sensors 130A, 130B located in different location(s) of the vehicle 100.

Next, in a block 320, the computer 110 receives vehicle 100 path P data. The computer 110 may be programmed to determine the path P based on, e.g., a destination location data received from a vehicle 100 HMI 140, data stored in a computer 110 memory, etc.

Next, in a block 330, the computer 110 determines an area of interest 210. In one example, the computer 110 may be programmed to identify the area of interest 210 based on a set of rules, e.g., as shown in of Table 1. The computer 110 may be programmed to identify an area of interest 210 for example as described above based on map data, physical barriers, a path P of the vehicle 100, location of the vehicle 100, etc.

With reference to FIG. 3B, next in a decision block 335, the computer 110 determines whether a sound source 160A, 160B, 160C (FIG. 2) is within the area of interest 210. The computer 110 may be programmed to determine whether the sound source 160A, 160B, 160C is within the area of interest 210 based on the location of the sound source 160A, 60B, 160C. If the computer 110 determines that the sound source 160A, 160B, 160C is within the area of interest 210, then the process 300 proceeds to a block 340; otherwise the process 300 proceeds to a block 355.

In the block 340, the computer 110 extracts the sound features of the received sound. For example, the computer 110 may be programmed to determine frequency component(s) of the received sound.

Next, in a block 345, the computer 110 classifies the sound source 160A, 160C based on the extracted sound features. For example, the computer 110 may be programmed to classify sound sources 160A, 160C to car, truck, emergency vehicle, train, pedestrian, bicycle, etc.

Next, in a decision block 350, the computer 110 determines whether the detected sound source 160A, 160C is valid or invalid, i.e., correctly classified or incorrectly classified. For example, the computer 110 may be programmed to determine that the sound source 160C classified as a train is invalid upon determining, based on the map data, that the expected infrastructure component is non-existent at the location of the source 160C. If the computer 110 determines that the sound source 160C is invalid, then the process 300 proceeds to a block 360; otherwise the process 300 proceeds to the block 355.

In the block 355, which can be reached from either of decision blocks 335, 350, the computer 110 ignores the detected sound source and proceeds to a block 365. For example, when the block 355 is reached from the decision block 335, the computer 110 ignores the sound source 160B outside the area of interest 210. When the block 355 is reached from the decision block 350, the computer 110 ignores the invalid sound source 160C.

In the block 360, the computer 110 adjusts the vehicle 100 path P based on the parameters such as classification, trajectory T, location, etc., of the detected sound source 160. The computer 110 may be programmed, e.g., based on the exemplary rules of Table 2, to adjust the vehicle 100 path P to a point on a shoulder 260 of the road 220A upon detecting a sound source 160A with an emergency vehicle classification. In another example, the computer 110 may be programmed to adjust the vehicle 100 path P to prevent a collision with a sound source 160A with a classification as pedestrian, vehicle, etc., e.g., using collision avoidance techniques including emergency braking, collision avoidance maneuver (e.g., by changing lane).

Next, in a block 365 that can be reached from either of blocks 355, 360, the computer 110 operates the vehicle 100 by actuating vehicle 100 actuators 120 such as braking, steering, and/or propulsion actuators 120. The computer 110 may be programmed to actuate the vehicle 100 actuators 120 to move the vehicle 100 along the path P, e.g., according to existing drive-by-wire techniques used to operate vehicles autonomously or semi-autonomously. When the block 365 is reached from the block 360, the computer 110 may actuate the vehicle 100 actuators 120 based on the adjusted path P, e.g., the adjusted path P to the road shoulder 260.

Following the block 365, the process 300 ends, or alternatively, returns to the block 305.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A vehicle system, comprising a processor and a memory, the memory storing instructions executable by the processor to:
    identify an area of interest from a plurality of areas on a map based on a distance from a current location of the vehicle and at least one of a physical barrier and a road boundary;
    determine that a detected sound is received in a vehicle audio sensor upon determining that a source of the sound is within the area of interest and not another area in the plurality of areas;
    determine based on a classification of the source and map data that the classification of the source is incorrect by:
        determining, based on the classification of the source, an expected infrastructure component for a determined location of the source; and
        determining that the classification of the source is incorrect upon determining, based on the map data, that the expected infrastructure component is nonexistent at the determined location of the source; and
    change the operation of the vehicle based at least in part on the detected sound and determining that the classification of the source is correct, wherein the classification of the source is determining a type of object is a moving object.

2. The vehicle system of claim 1, wherein the instructions further include instructions to ignore the detected sound upon determining that the source of the detected sound is without the area of interest.

3. The vehicle system of claim 1, wherein the instructions further include instructions to identify the area of interest based in part on a planned route of the vehicle.

4. The vehicle system of claim 1, wherein the instructions further include instructions to: determine a parameter of the source including at least one of a type, a trajectory, and a location of the source based on at least an amplitude and a frequency of the detected sound; and determine that the source is included in an object in the area of interest based on the determined parameter and map data.

5. The vehicle system of claim 4, wherein the instructions further include instructions to adjust a planned path of the vehicle based on a planned route of the vehicle and the determined trajectory of the source.

6. The vehicle system of claim 1, wherein the instructions further include instructions to determine a location of the source and to determine that the source is within the identified area of interest based on the determined location of the source.

7. The vehicle system of claim 1, wherein the classification is at least one of a train, a truck, a bicycle, a motorbike, a passenger vehicle, a pedestrian, and an emergency vehicle.

8. The vehicle system of claim 7, wherein the infrastructure component is one of a train track and a road.

9. The vehicle system of claim 1, wherein the instructions further include instructions to adjust a planned path of the vehicle based on a planned route of the vehicle, a determined trajectory of the source, and the classification of the source only upon determining that the source is correctly classified.

10. A method, comprising:
    identifying an area of interest from a plurality of areas on a map based on a distance from a current location of the vehicle and at least one of a physical barrier and a road boundary;

determining that a detected sound is received in a vehicle audio sensor upon determining that a source of the detected sound is within the area of interest and not another area in the plurality of areas;

determining based on a classification of the source and map data that the classification of the source is incorrect by:

determining, based on the classification of the source, an expected infrastructure component for a determined location of the source; and determining that the classification of the source is incorrect upon determining, based on the map data, that the expected infrastructure component is nonexistent at the determined location of the source; and change the operation of the vehicle based at least in part on the detected sound and determining that the classification of the source is correct, wherein the classification of the source is determining a type of object is a moving object.

11. The method of claim 10, further comprising ignoring the detected sound upon determining that the source of the detected sound is without the area of interest.

12. The method of claim 10, further comprising: determining a parameter of the source including at least one of a type, a trajectory, and a location of the source based on at least an amplitude and a frequency of the detected sound; and determining that the source is included in an object in the area of interest based on the determined parameter and map data.

13. The method of claim 10, further comprising adjusting a planned path of the vehicle based on a planned route of the vehicle and a determined trajectory of the source.

14. The method of claim 10, further comprising adjusting a planned path of the vehicle based on a planned route of the vehicle, a determined trajectory of the source, and the classification of the source only upon determining that the detected source is correctly classified.

15. The method of claim 10, wherein the classification is at least one of a train, a truck, a bicycle, a motorbike, a passenger vehicle, a pedestrian, and an emergency vehicle.

16. The method of claim 15, wherein the infrastructure component is one of a train track and a road.

\* \* \* \* \*